Nov. 8, 1949 — C. F. COAKE — 2,487,523
ELECTRIC MICROGAUGE SYSTEM
Filed Feb. 16, 1945 — 2 Sheets-Sheet 1
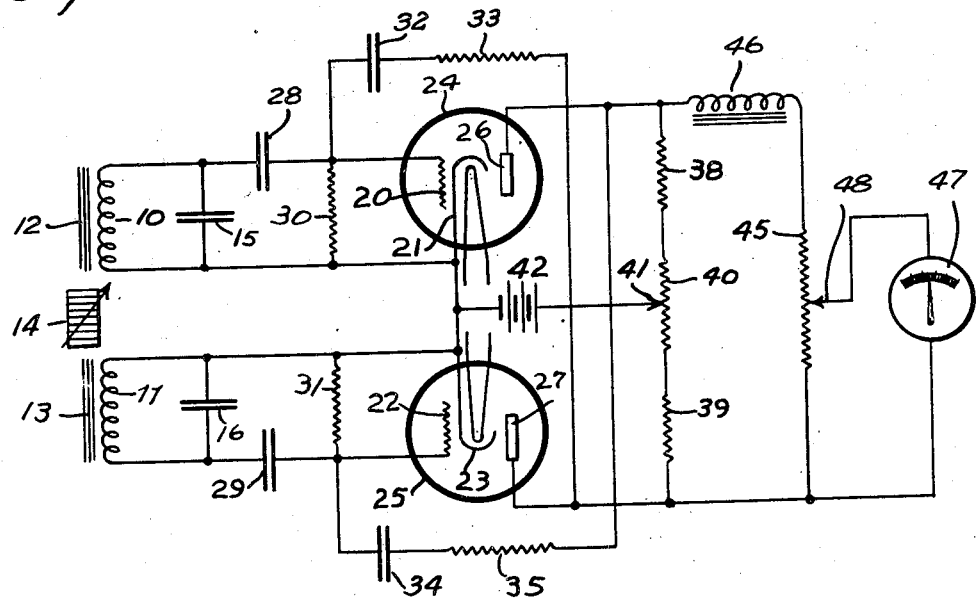
Fig. 1.
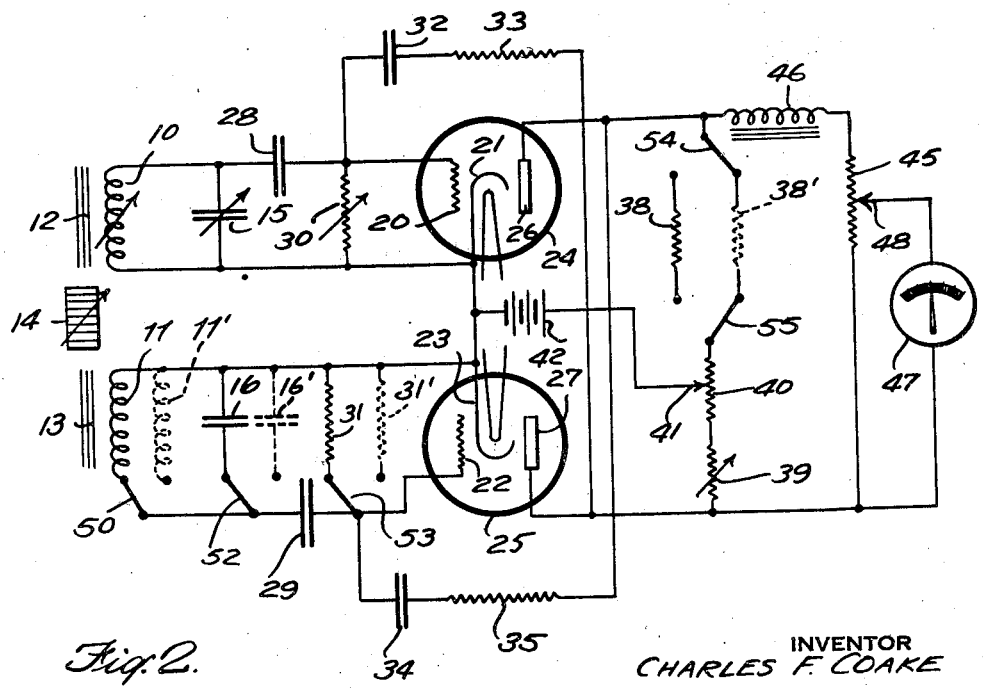
Fig. 2.
INVENTOR
CHARLES F. COAKE
BY 
ATTORNEY Nov. 8, 1949     C. F. COAKE     2,487,523
ELECTRIC MICROGAUGE SYSTEM
Filed Feb. 16, 1945     2 Sheets-Sheet 2

INVENTOR
CHARLES F. COAKE
BY
ATTORNEY

Patented Nov. 8, 1949

2,487,523

UNITED STATES PATENT OFFICE 2,487,523

ELECTRIC MICROGAUGE SYSTEM

Charles F. Coake, Indianapolis, Ind., assignor to Senn Corporation, New Augusta, Ind., a corporation of Indiana Application February 16, 1945, Serial No. 578,320

7 Claims. (Cl. 177—351)

This invention relates to electric microgauges of the type including a variable impedance device the impedance of which is varied in accordance with the quantity to be measured, and more particularly to a novel and improved system for actuating an instrument in response to such changes in impedance.

An object of the invention is to provide a system of the above type having improved characteristics of sensitivity and dependability.

Another object is to provide an instrument of the above type which may be readily adjusted for different ranges of indication.

Another object is to provide a system of the above type having a plurality of measuring heads and circuit means for switching from one head to the other without any readjustment of the circuit constants.

Another object of the invention is to provide a system for making direct measurements of unknown values of resistance, capacity and inductance.

Various other objects and advantages will be apparent as the nature of the invention is more fully disclosed.

In accordance with the present invention the variable impedance device is connected in circuit with a pair of space discharge devices operating as a push-pull oscillator and locked in step by suitable coupling means. The variable impedance devices are so connected in the circuit that when they are of predetermined impedance the grids of the two oscillator tubes are operated at the same bias and the tubes draw equal space currents. Any change in the relative impedances of the two devices, however, produces unequal grid voltages and causes the tubes to draw unequal space currents. A measuring device such as a center indicating micro-voltmeter is connected to measure the unbalance between the space currents drawn by the two tubes.

It has been found that a circuit of the above type is extremely sensitive to minute changes in impedance of the variable impedance device and that indications of extreme sensitivity may be obtained.

In order to adapt the circuit for measurement of variables having different ranges, a pair of output resistance networks are provided which are connected between the outputs of the oscillator tubes and the indicating instrument. Switching means is arranged to connect the different networks into the circuit in accordance with the range of variables to be measured.

In order to adapt the system for use with a plurality of measuring heads as for example in a template for measuring different parts of an object, a separate set of output and adjusting networks is provided for each head and switching means is arranged to connect into the circuit the network which corresponds to the particular head being used for measurement. In this way each network may be properly adjusted in accordance with the constants of the respective heads so that the measuring instrument may be instantly switched from one measuring head to the other without stopping to make intermediate adjustments of the circuit.

Another feature of the invention resides in the provision of means for making a direct measurement of unknown resistances, capacities and inductances. These elements are switched into corresponding parts of the circuit to replace one of the matched elements of the push-pull oscillator and are measured by making suitable adjustments of the corresponding matched elements to produce balanced operating conditions in the oscillator as indicated by a zero indication on the indicating instrument.

Although the novel features which are believed to be characteristic of this invention are pointed out more fully in the claims, the invention will be better understood by referring to the following description taken in connection with the accompanying drawings in which specific embodiments thereof have been set forth for the purposes of illustration.

In the drawings,

Fig. 1 is a schematic diagram of a simple circuit illustrating the basic principles of the present invention;

Fig 2 is a schematic diagram illustrating an adaptation of the circuit of Fig. 1 to the measurement of unknown values of resistance, capacity and inductance.

Figure 3:
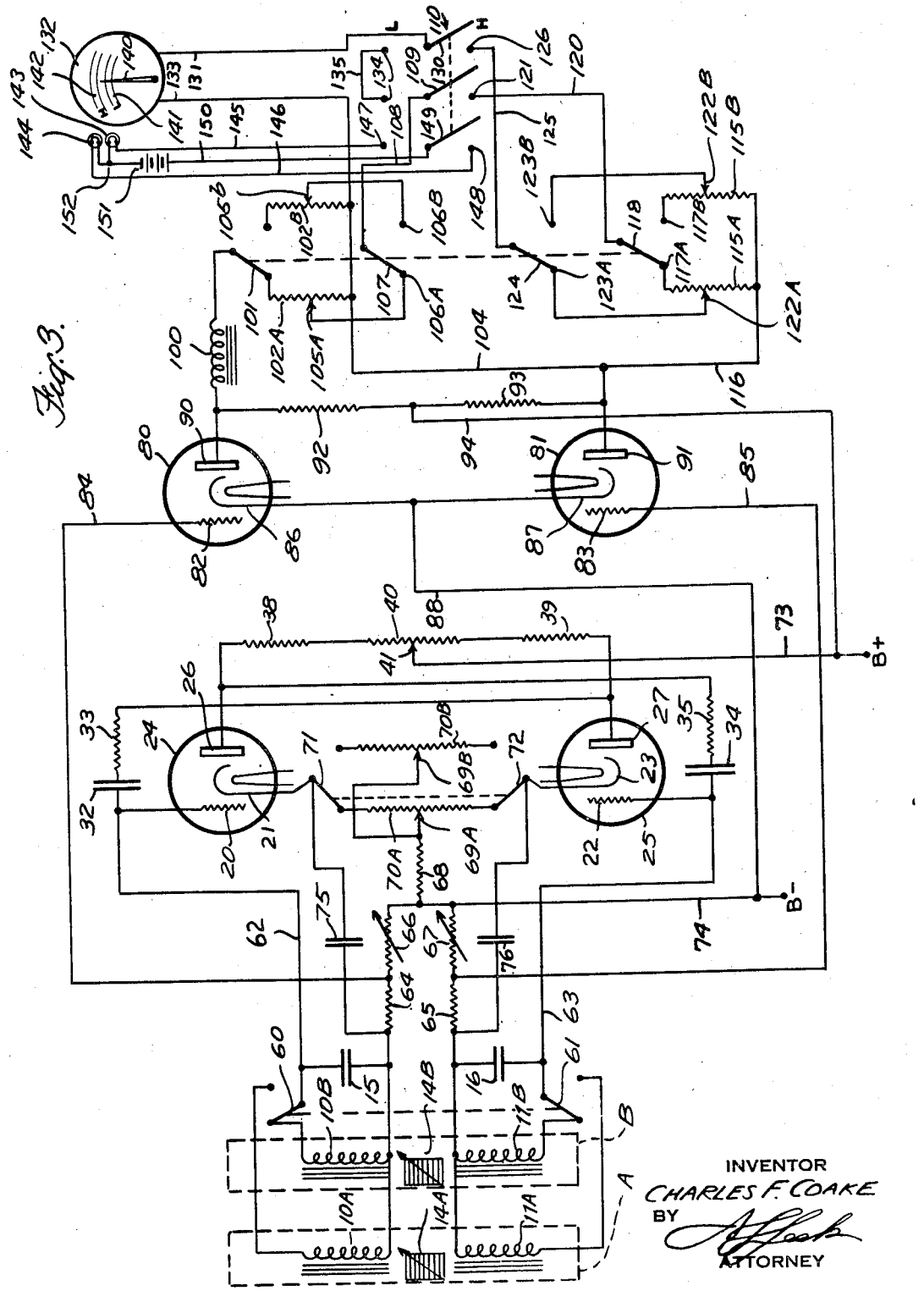
Fig. 3 is a schematic diagram of a measuring circuit incorporating a plurality of measuring heads and a plurality of resistance networks corresponding to the different heads and to the different ranges of measurements.

Although specific terms have been used herein for convenience in referring to the various details of the invention, it is to be understood that these terms are to be given an interpretation commensurate with the state of the art.

Referring to Fig. 1, the variable impedance elements are shown as comprising a pair of coils 10, 11 associated with a magnetic circuit including fixed cores 12 and 13 and an armature 14 mounted for movement in response to variations in the quantity being measured and adapted to vary the reluctance of the magnetic circuits in an inverse manner for effecting corresponding changes in the impedances of the coils 10 and 11. The construction of a suitable unit including the coils 10 and 11 is shown more in detail in my copending application, Serial No. 548,281 filed August 5, 1944, now Patent No. 2,466,382, for Micro-limit indicating system and only so much thereof is shown herein as is necessary for an understanding of the present invention.

Condensers 15 and 16 are connected respectively across coils 10 and 11 and are so related to the coils 10 and 11 as to form therewith tuned circuits which are resonant at a predetermined frequency such as 180 cycles when the variable armature 14 is in its mid-position.

The coils 10 and 11 are connected respectively to the grid 20 and cathode 21, and grid 22 and cathode 23 of space discharge tubes 24 and 25 having plates 26 and 27 respectively. Blocking condensers 28 and 29 and grid leak resistors 30 and 31 are connected in the respective input circuits. The tubes 24 and 25 may comprise a double triode or may comprise separate triodes or multi grid tubes as desired.

The plates and grids of the tubes 24 and 25 are coupled by cross connections including condenser 32 and resistance 33 connected in series between the grid 20 of the tube 24 and the plate 27 of the tube 25, and a condenser 34 and resistance 35 connected in series between the grid 22 of the tube 25 and the plate 26 of the tube 24.

The plates 26 and 27 are interconnected by a resistance network including fixed resistors 38 and 39 and a potentiometer 40 is connected in series. The tap 41 of the potentiometer 40 is connected through a source of plate potential, shown as a battery 42, to the cathodes 21 and 23. It is to be understood that the tubes 24 and 25 may be provided with suitable heaters, control elements, and sources of biasing potential not shown.

A potentiometer 45 is connected in series with a choke 46 across the resistance network including the resistors 38, 39, and 40. A measuring instrument 47, such as a center reading millivoltmeter, is connected across one side and a variable tap 48 of the potentiometer 45.

In the above circuits the resistances 33 and 35 and the condensers 32 and 34 constitute feedback networks which cross connect the oscillator tubes to cause them to operate in unison and in a push-pull relationship, the plate of one tube being 180° out of phase with respect to the grid of the other tube. The tuned grid circuits cause the tubes to oscillate at the predetermined frequency. In addition to the feed-back network the tubes are coupled through the mutual inductance of the coils 10 and 11 due to the armature 14 and the associated magnetic circuits and are thus further stabilized to operate in unison at said predetermined frequency.

When the coils 10 and 11 are of equal impedance the circuits including the coils 10 and 11 and the condensers 15 and 16 respectively are similarly tuned and the grids 20 and 22 have an equal swing and cause both tubes to draw the same space current. Under these conditions, both ends of the resistance network 38, 39 and 40 at at the same potential and a zero reading is obtained on the instrument 47. The potentiometer 40 is adjusted to compensate for variations in tube characteristics and to produce a zero indication on the instrument 47 under the conditions above specified.

When the impedances of the coils 10 and 11 are varied in an opposite sense by movement of the armature 14, the tuned circuits are correspondingly varied and the grid potentials are changed so that the tubes 24 and 25 no longer draw the same space current, although the frequency of oscillation is not appreciably changed. The potentials of the two ends of the resistance network 38, 39, 40 are no longer equal and a reading is obtained on the instrument 47 which is a direct indication of the amount of unbalance in the space current, which in turn is a function of the movement of the armature 14. The potentiometer 45 provides a sensitivity adjustment and may be set to produce a full scale movement of the instrument for a predetermined range of movement of the armature 14. The choke 46 prevents the alternating component from passing to the indicator circuit. The resistances 33 and 35 are of a value to stabilize the operation of the system.

In the embodiment shown in Fig. 2 the system is adapted to the direct measurement of unknown resistances, capacities and inductances. In this embodiment the parts corresponding to those of Fig. 1 have been given the same reference characters. However, a switch 50 is provided for selectively connecting the coil 11 or an unknown coil 11' into the circuit; a switch 52 is provided for selectively connecting condenser 16 or an unknown capacity 16' into the circuit, switch 53 is provided for selectively connecting the grid leak resistance 31 or an unknown resistance 31' into the circuit and switches 54 and 55 are provided for selectively connecting the known resistance 38 or unknown resistance 38' into the circuit.

In the operation of this system the switches 50, 52, 53, 54 and 55 are first set to connect the known elements into the circuit and suitable adjustment is made by means of the armature 14 and the tap 41 of the potentiometer 40 to obtain a balanced operating condition as indicated on the indicating instrument 47. When a zero indication has been obtained as above indicated, the appropriate switch 50, 52, 54 or 55 is actuated to connect the unknown element into the circuit, leaving the other elements unchanged. If, for example, the inductance of an unknown coil 11' is to be measured the switch 50 will be actuated and a balance will be reestablished by varying the inductance of the coil 10 or by changing the setting of the potentiometer 40. In the former case the coil 10 constitutes a standard element, the inductance of which for various settings is known and may be indicated on a suitable scale, or if the balance is restored by means of the tap 41 of the potentiometer 40 a previously calibrated scale is provided on which the inductance of the unknown element 11' may be read.

In case the capacity of an unknown element 16' is to be measured, the same procedure is adopted and the capacity of the condenser 15 is varied to restore a balance. The condenser 15 in this case constitutes a standard, the capacity of which may be indicated on a suitable scale.

For measuring the value of an unknown resistance 31' the above procedure is varied by adjusting the value of the grid-leak resistor 30 until a balance is restored. In this case the grid-leak resistor 30 constitutes a standard resistance, the value of which may be determined from a suitable scale.

If the value of a resistance 38' is to be determined a similar procedure is adopted varying the value of the resistance 39 which in that case becomes a standard.

It will be noted that resistances up to the order of 50,000 ohms may be measured in the place indicated by the unknown resistance 38' and resistances from that point up to the value of several megohms may be measured in the location indicated by the resistance 31'. Hence, by a suitable substitution of elements the value of any high or low resistance may be obtained by a direct reading and without any mathematical calculations. Likewise, the value of an unknown inductance or capacity may be obtained by a direct reading. It is to be understood that suitable standard resistor blocks may be incorporated for the resistors 30 and 39 and that the inductance 10 and condenser 15 may represent networks of known values which may be built up to the desired capacity and inductance values.

The system shown in Fig. 3 comprises a head A having variable impedance coils 10A and 11A provided with an armature 14A similar to the corresponding elements of Fig. 1 and a head B comprising coils 10B and 11B and an armature 14B of similar construction to the head A. The coils 10A, 10B and 11A, 11B are respectively connected by switches 60 and 61 in circuit with condensers 15 and 16 to form tuned circuits as above described. The switches 60 and 61 are connected to be operated in unison so that either the head A or the head B may be connected in circuit as desired.

The tuned circuits are connected by lines 62 and 63 to the grids 20 and 22 of oscillator tubes 24 and 25 respectively which are similar to the correspondingly numbered tubes of Fig. 1. The grid returns are connected through fixed resistors 64 and 65 respectively and adjustable bias resistors 66 and 67 respectively and a common resistor 68 to taps 69A and 69B on potentiometers 70A and 70B respectively. The cathodes 21 and 23 of the tubes 24 and 25 are connected by switches 71 and 72 to opposite ends of either the potentiometer 70A or the potentiometer 70B. The switches 71 and 72 are preferably connected for operation in unison and in unison with the switches 60 and 61 so that the potentiometer 70A is connected in circuit with the head A and the potentiometer 70B is connected in circuit with the head B. In this way zero adjustments may be made on each potentiometer to correspond with the characteristics of the particular head with which it is associated.

The plates 26 and 27 of the tubes 24 and 25 are connected across a resistor assembly including fixed resistances 38 and 39 and a potentiometer 40 similar to the corresponding elements of Fig. 1. The variable tap 41 of the potentiometer 40 is connected by a line 73 to a suitable source of plate potential, the negative terminal of which is connected by a line 74 to the junction between the resistor 68 and the resistors 66 and 67 so that the resistor 68 constitutes a source of cathode bias.

The feedback network comprising the condensers 32 and 34 and resistances 33 and 35 is cross connected between the grids and plates of the tubes 24 and 25 as in Fig. 1. By-pass condensers 75 and 76 are connected across the respective grid return resistors to the cathodes 21 and 23 respectively to eliminate the alternating current component from said resistors.

In the embodiment of Fig. 3, a stage of amplifications is provided which comprises tubes 80 and 81 having grids 82 and 83 connected respectively by lines 84 and 85 to the grid side of resistors 66 and 67 and having cathodes 86 and 87 connected by a line 88 to the plate return line 74. Tubes 80 and 81 are provided with plates 90 and 91 between which are connected resistors 92 and 93, the mid point of which is connected by line 94 to the source of plate potential.

The plate side of the resistor 92 is connected through a choke 100 to a double pole switch 101 having contacts connected to potentiometers 102A and 102B respectively, the opposite sides of which are connected by line 104 to the plate side of the resistor 93. The potentiometers 102A and 102B are provided with taps 105A and 105B which are connected respectively to contacts 106A and 106B of a double switch 107, the blade of which is connected by line 108 to a blade 109 of a triple pole double throw switch 110.

A pair of potentiometers 115A and 115B have one side connected by a line 116 to the plate side of the resistor 93 and have their other ends connected to contacts 117A and 117B of a double throw switch 118, the blade of which is connected by a line 120 to a contact 121 of the switch 110. The potentiometers 115A and 115B are provided with taps 122A and 122B which are connected respectively to contacts 123A and 123B of a double throw switch 124, the blade of which is connected by a line 125 to a contact 126 of the switch 110. The switches 101, 107, 124 and 118 are connected for actuation in unison and in unison with the switches 60 and 61 so as to connect the A elements in circuit when the A head is used and the B elements when the B head is used.

The blade 130 of the switch 110 is connected by a line 131 to an indicating instrument 132 the return from which is connected by a line 133 to the line 104. Contacts 134 of the switch 110 are connected together by a line 135.

The instrument 132 is shown as provided with a pointer 140 cooperating with a pair of scales 141 and 142 which are adapted to be illuminated respectively by lights 143 and 144. The lights 143 and 144 are connected respectively by lines 145 and 146 to contacts 147 and 148 of the switch 110, the blade 149 of which is connected by a return line 150 through a current source, shown as a battery 151, to the return line 152 of the lights 143 and 144 so that the lights are selectively energized in accordance with the position of the switch 110.

It is to be understood that the switches 60, 61, 71, 72, 101, 107, 124 and 118 are preferably arranged in the form of a gang switch with a unicontrol so that they are operated in unison to the A position or the B position. When in the A position the measuring head A and the potentiometer 70A, 102A and 115A are connected in circuit.

Under these operating conditions, the tubes 24 and 25 operate as a push-pull oscillator in the manner explained in connection with Fig. 1 and, with the armature 14A in its mid position, the tap 69A of the potentiometer 70A is adjusted to compensate for any mechanical variation in the coils 10A and 11A so as to produce balanced operating conditions at the grids 20 and 22. The tap 69A accordingly constitutes a zero set which compensates for variations in the heads and in the tuned circuits. The tap 41 of the potentiometer 40 is also adjusted to produce equal space currents as indicated by the reading on the indicator instrument 132. The tap 41 thus constitutes a zero set to compensate for variations in the oscillator tubes or amplifier tubes and the associated circuits.

With the gang switch in the B position, the head B and the potentiometer 70B, 102B and 115B are connected in circuit. The tap 69B of the potentiometer 70B is then adjusted in accordance with the characteristics of the B head in the same manner as the tap 69A above mentioned. Thereafter, the taps 69A and 69B remain fixed and provide automatic compensation for variation between the heads so that no further adjustment is required when shifting from one head to the other.

With the grid return resistances 66 and 67 connected in the grid return lines as shown in Fig. 3 and by-passed for alternating currents by condensers 75 and 76 alternating potentials on the grid are eliminated and the potential drop across the resistances due to variations in grid current produce a variable bias on the grids of the respective tubes 24 and 25. This voltage drop across the resistances 66 and 67 is applied to the grids of the amplifier tubes 80 and 81 to control the space currents in the respective amplifier tubes. Any unbalance in space currents in the amplifier tubes produces a voltage differential at the opposite ends of the resistor network 92, 93 which is measured by the attenuation network including potentiometers 102A and 102B, 115A and 115B and produces a deflection of the indicating instrument 132.

In the embodiment shown, the attenuation network is arranged for a high or a low sensitivity position and corresponding scales 141 and 142 are provided on the instrument 142. The switch 110 is connected to change from the high sensitivity network to the low sensitivity network and at the same time to illuminate the corresponding scale 141 or 142. With the switch 110 in the L position, corresponding to low sensitivity, and with the gang switch in the A position, the potentiometer 105A is connected directly across the resistance network 92, 93 and the instrument 132 is connected across the variable tap 105A of the potentiometer 102A by a circuit including the switch 107, line 108, blade 109 of the switch 110, contacts 134 and connecting line 135, blade 130, line 131 to the instrument 132, thence by the return line 133 to the lower end of the potentiometer 102A. At the same time the blade 149 closes a circuit from the battery 151 to the lamp 143 which is arranged to illuminate the L scale 141. With the gang switch in the B position the same circuit is established to place the instrument 132 across the variable tap 105B of the potentiometer 102B.

Under the above conditions the potentiometers 102A, 102B constitute sensitivity controls and the position of the taps 105A, 105B determines the portion of the potential drop across the potentiometer which is applied to the indicating instrument 132. These taps will normally be adjusted so that a predetermined movement of the armatures 14A or 14B will produce a full scale movement of the pointer 140 of the instrument 132.

With the switch 110 in the H position, the instrument 132 instead of being connected across the tap of the potentionmeter 102A or 102B, is connected across the tap 115A or 115B, and the potentiometers 115A and 115B are connected respectively across the variable taps of the potentiometers 102A and 102B. With the gang switch in the A position, the circuit may then be traced from the variable tap 105A through switch 107, line 108, blade 109, contact 121, line 120, switch 118 and contact 117A to potentiometer 115A and thence through line 116 to the return line 104, thereby placing the potentiometer 115A directly across the variable tap 105A of the potentiometer 102A. The circuit to the measuring instrument 132 may be traced from the tap 122A of the potentiometer 115A, contact 123A, switch 124, line 125, contact 126, blade 130, line 131 to instrument 132; thence by the return line 133, line 104 and line 116 to the other side of the potentiometer 115A, thereby placing the instrument 132 across the variable tap 122A of the potentiometer 115A. At the same time, the blade 149 completes a circuit from the battery 151 to the light 144 to illuminate the H scale 142 of the instrument 132. In this position the taps 105A and 122A constitute the sensitivity control and are adjusted to produce a full scale movement of the pointer 140 in response to a predetermined movement of the armature 14A which may be substantially less than the movement measured with the switch 110 in the low sensitivity position. Adjustment of the grid leak resistances 66 and 67 also provides a sensitivity control, the sensitivity being higher when the resistance is higher and vice versa. With the gang switch in the B position the same circuits are established to connect the potentiometer 115B to the tap 105B and the instrument 132 to the tap 122B.

The lights 143 and 144 may be placed in separate compartments to selectively illuminate the respective scales 141 and 142, or if desired the scales may be made of complementary colors such as red and green and the lights 143 and 144 may be of corresponding colors so that only one scale is rendered visible at a time.

It has been found that the above circuit provides extreme sensitivity and may be used to measure movements of the armature 14A or 14B of the order of millionths of an inch.

The use of an attenuation network, including the second potentiometers, permits the circuit to be adjusted for high sensitivity without drawing excessive current from the plate circuits of the tubes 80 and 81 which would tend to make the response non-linear. The choke 100 eliminates the A. C. components from the measuring circuit.

When the impedances of the two coils 10A and 11A or 10B and 11B are equal, equal voltages are applied to the grids 20 and 22 and equal space current is drawn by the two tubes. However, when the impedance of one of the coils decreases and that of the other coil increases, the grid bias of the tubes change correspondingly because one of the tubes will then draw less grid current than the other due to the smaller A. C. swing and that tube will pass a correspondingly less space current. The mutual coupling between the two coils 10 and 11 through the common armature 14A tends to lock the oscillators in step, although the coupling may be quite loose. However, the cross connection between the plates and grids of the two tubes tends to keep the oscillators in step without mutual coupling. The mutual coupling in the grid circuit, however, is more effective for holding the oscillators in step than an equal amount of coupling in the plate circuit. Consequently, the coupling produced by the armature 14 is of importance in stabilizing the operation.

In the system shown, two sets of attenuation networks are provided so that they may be individually adjusted in accordance with the particular head to be used for measuring purposes. This permits the networks to be adjusted independently and in accordance with the respective measurements being taken so as to produce the desired full scale swing of the pointer 140 which may or may not be in response to identical movements of the armatures 14A or 14B.

The two heads may be useful for the rapid measurement of parts having two dimensions which are to be checked, in which event the heads will be arranged to be engaged by the respective parts either simultaneously or in sequence, and after placing the parts in position it is only necessary for the operator to actuate the gang switch for connecting first the A head and then the B head in circuit, in each instance noting the measurement on the corresponding scale of the instrument 132. For routine checking purposes the scales are preferably arranged as a limit scale with a mark to indicate the permissible limit of movement of the pointer 140, any movement of the pointer beyond these points indicating an excessive variation in the dimensions of the parts.

The instrument may be adjusted so that ordinarily a measurement may be taken with the high sensitivity scale. If, however, the variation in dimensions of the part is such that when measured on this scale the pointer 140 moves entirely across the corresponding scale of the instrument 132 the switch 110 may be changed to the low sensitivity position and the reading of the dimension of the part may be taken on the low sensitivity scale. In this way the various readings may be accurately and rapidly taken with a minimum of mechanical manipulation of the parts.

It is to be understood, of course, that any desired number of heads may be provided and that a corresponding set of attenuation networks will be connected to be placed in circuit by the gang switch. The gang switch may be automatically operated to connect the various heads in circuit in recurring sequence. The system accordingly provides for the taking of a plurality of readings by means of a single indicating instrument without duplicating the main parts of the measuring circuit. At the same time the circuits are individually adjusted in accordance with the parts to be measured with the individual measuring heads.

The above system may be used as indicated in Fig. 2 for measuring any element of the circuit or for checking tubes. The system has the advantage of a low power input to the grid which permits the use of a smaller head and reduces the power required for actuating the stylus which controls the armature 14. At the same time the system has a high degree of stability due to the balanced effects of the tubes. The individual tube circuits for the two oscillator tubes with the cross coupling make it possible to vary individually the LC ratio of each of the input circuits so as to obtain a minimum harmonic output when the tubes are in balance.

Although certain specific embodiments of the invention have been shown for purposes of illustration, its to be understood that the invention is capable of various uses as will be apparent to a person skilled in the art. The invention is only to be limited in accordance with the scope of the following claims.

What is claimed is:

1. An electric measuring system comprising a push-pull oscillator including a pair of tubes having cross-connected feedback circuits for causing said tubes to oscillate in unison and having individual tuned input circuits, each including an inductance and a capacity, said inductances being variable in opposite sense in response to a quantity to be measured to produce a corresponding change in the space currents drawn by the two tubes, and means responsive to the unbalance in said space current.

2. An electric measuring system comprising a push-pull oscillator including a pair of tubes having cross-connected feedback circuits for causing said tubes to oscillate in unison and having individual tuned input circuits, each including an inductance and a capacity, said inductances having mutual coupling and being variable in opposite sense in response to a quantity to be measured to produce a correponding change in the space current drawn by the two tubes, and means responsive to the unbalance in said space currents.

3. An electric measuring system comprising a push-pull oscillator including a pair of tubes having cross-connected feedback circuits for causing said tubes to oscillate in unison and having individual tuned input circuits, each including an inductance and a capacity, said inductances being variable in opposite sense in response to a quantity to be measured to produce a corresponding change in the space currents drawn by the two tubes, and an indicator connected to measure the unbalance in said space currents.

4. An electric measuring system comprising a push-pull oscillator including a pair of tubes having cross-connected feedback networks for causing said tubes to oscillate in unison and having individual tuned input circuits, each including an inductance and a capacity, said inductances being variable in opposite sense in response to a quantity to be measured to produce a corresponding change in the space currents drawn by the two tubes, a resistance network interconnecting the output circuits of said tubes to produce a voltage differential in response to differential space currents and a measuring circuit connected to measure tthe voltage differential across said network.

5. An electric measuring system comprising a push-pull oscillator including a pair of tubes having intertube coupling means to cause said tubes to oscillate in unison and having individual tuned input circuits each including a variable impedance device, said last devices having a common armature variable in response to a quantity being measured to vary the impedances of said devices in opposite sense, and produce corresponding changes in the space currents drawn by said tubes, and a measuring circuit connected to measure the unbalance in space currents.

6. An electric measuring system comprising a push-pull oscillator including a pair of tubes having intertube coupling means to cause said tubes to oscillate in unison and having individual tuned input circuits each including a variable impedance device, said last devices having a common armature variable in response to a quantity being measured to vary the impedances of said devices in opposite sense and produce corresponding changes in the space currents drawn by said tubes, a measuring circuit connected to measure the unbalance in space currents and adjusting means to equalize the space currents in said tubes when said armature is in a mid-position.

7. In an electric measuring system a push-pull oscillator comprising a pair of tubes having grids and plates, a feedback coupling including a condenser and resistor connected in series between the grid of each tube and the plate of the other tubes, individual tuned input circuits for said tubes including inductances and capacities connected in parallel, said inductances being variable in opposite sense in response to the quantity being measured, self-biasing resistors in the grid return circuit of each tube connected to cause the space currents drawn by said tubes to vary with said changes in inductances, and means connected to respond to an unbalance between said space currents.

CHARLES F. COAKE.

REFERENCES CITED

The following references are of record in the file of this patent:

UNITED STATES PATENTS

| Number | Name | Date |
| --- | --- | --- |
| 2,079,134 | Terman | May 4, 1937 |
| 2,111,235 | Avins | Mar. 14, 1938 |
| 2,149,756 | Arenberg et al. | Mar. 7, 1939 |
| 2,208,329 | Morelock | July 16, 1940 |
| 2,338,732 | Nosker | Jan. 11, 1944 |
| 2,367,965 | Rushing | Jan. 23, 1945 |
| 2,371,395 | Keeling | Mar. 13, 1945 |
| 2,415,773 | Vilkomerson | Feb. 11, 1947 |